United States Patent [19]

Csikós et al.

[11] 4,148,959
[45] Apr. 10, 1979

[54] LAMINATED COATING SYSTEM FOR INSULATION

[75] Inventors: Rezsó Csikós; András Balogh, both of Veszprém; József Herendi, Balátonalmádi; Katalin Gregor, nee Balogh, Veszprém, all of Hungary

[73] Assignee: Magyar Ásványolaj és Földgáz Kisérleti Intézet, Veszprém, Hungary

[21] Appl. No.: 796,887

[22] Filed: May 16, 1977

[51] Int. Cl.² .................. B32B 11/00; B32B 11/04; C09J 7/02
[52] U.S. Cl. .................. 428/215; 138/141; 428/489; 428/518; 428/354; 428/468
[58] Field of Search .......... 138/141, 145, 146, 149; 428/489, 517, 518, 519, 520, 522, 509, 343, 354, 355, 468, 332, 215

[56] References Cited

U.S. PATENT DOCUMENTS

| | | | |
|---|---|---|---|
| 3,459,695 | 8/1969 | Hedge et al. | 428/489 X |
| 3,967,020 | 6/1976 | Uemura et al. | 428/489 X |
| 3,967,651 | 7/1976 | Snyder et al. | 138/145 |
| 4,039,706 | 8/1977 | Tajima et al. | 428/468 X |

Primary Examiner—George F. Lesmes
Assistant Examiner—Daniel R. Zirker

[57] ABSTRACT

A self adhesion ensuring layer having a total thickness of 0.05 to 0.2 mm is carried on a PVC-foil carrier sheet having a thickness of 0.2 to 0.5 mm. The self adhesion ensuring layer comprises 70 to 100% by weight of synthetic caoutchouc, 0 to 16% by weight bitumin and 0 to 14% by weight talc. A ground layer may be interposed between the carrier sheet and self adhesion ensuring layer. The resultant system is useful for insulation of underground pipe.

14 Claims, No Drawings

LAMINATED COATING SYSTEM FOR INSULATION

The present invention relates to a laminated coating system, preferably for the insulation of underground pipe-lines, metal and concrete objects. The coating system according to this invention comprises a PVC-foil as carrier sheet, optionally containing bitumen, and an insulating layer and self-adhesive layer on the top of it. The laminated coating system is suitable for waterproofing and corrosion-proofing of the above-given objects.

Some of the foils known for insulation use are coated by layers containing liquid softeners, thus dialkyl phthalates, e.g., dioctyl phthalate. In this case, a migration of the softener into the foil takes place, which can make the foil sheets stick together during storage.

There are also other laminated coating systems, known in the art in which the foil is coated by a layer comprising bitumen, liquid softener, PVC and loading and auxiliary components (see for example "Protecto Wrap" and "Maflo Wrap" produced by A. Long Products Ltd., England). The foils are separated from each other by a siliconated paper rolled between them. The siliconated paper prevents the sheets from sticking together but makes the use rather complicated, and consequently, results in a more expensive product.

It has been described that the migration of the softener modifies the original properties of the foil (Dr. L. Kovács, Müanyag Zsebkönyv, Müszaki Könyvkiadó, Budapest, /1964/ 230).

For the insulation of pipe-lines there are insulators known in the art which do not contain liquid softener, and thus are easy to store. Some of them, however, show unsatisfactory adhesiveness. Therefore, the overlappings can not ensure a complete tightness, and thus the corrosive medium penetrates between the insulating foil and the object to be protected (Plicoflex Bulletin, Plicoflex Inc. Houston, Tex. 7705, Material protection and Performance 9, 7, 1970 /26 to 28/; 5, 9, 1966 /41 to 46/). For example the products "Plicoflex" and "Polyken" belong to this group.

The present invention relates to a laminated coating system comprising a PVC-foil and a composition containing bitumen, pyrolytic resin, synthetic caoutchouc, bactericide, an agent increasing adhesive capacity and acting as softener, which is not liable to migration. The laminated coating system preferably is used for the insulation of pipe-lines.

The laminated coating system comprises (a) a PVC-foil, optionally containing 6 to 14 % by weight asphalt and having a thickness of 0.2 to 0.5 mm, as carrier sheet, (b) a ground layer comprising 5 to 20 % by weight synthetic caoutchouc, 10 to 25% by weight polymer acting as softener and increasing the adhesiveness, preferably isobutylene butadiene-cis/trans-butene-terpolymer, having a molecular weight of 500 to 1200, 0.1 to 1% by weight bactericide compound, 55 to 85% by weight bitumen or a 4:1 mixture of bitumen and pyrolytic resin, the total thickness of which is 0.05 to 0.1 mm, and (c) a layer ensuring the self-adhesion, comprising 70 to 100% by weight synthetic caoutchouc, 0 to 16% by weight bitumen and 0 to 14% by weight talc, the total thickness of which is 0.05 to 0.2 mm.

The synthetic caoutchouc ingredient improves the flexibility as well as the characteristics measured at high and low temperature of the coating system, thus improves the heat-proofness, plasticity, tensile strength and self-adhesiveness.

As synthetic caoutchouc preferably polyisobutylene can be used. There can be used also polymers containing chlorine, thus chloroprene, and other compounds having similar physical and chemical characteristics, for example isobutylene-copolymer, which has the following characteristics: density: 0.92 g/cm$^3$, shore-hardness (Shore A): 30, cold resistance: $-50°$ C., specific resistance: $10^{15}$ Ohm.cm, dielectric strength: 23 kV/mm.

The resins acting as softeners and improving the adhesiveness comprises the co-polymers consisting of isobutylene, butadiene, cis- and trans-butene, thus the isobutylene-butadiene-cis/trans-butene-terpolymers. None of these compounds is liable to migration.

The molecular weight of the above identified compounds is 500 to 1200 and iodine-bromine number thereof is 80 to 120 g $I_2$/100 g. A typical representative of these polymers is a terpolymer, constituted from 45% of isobutylene, 33% butadiene, 12% cis-butene, 10% trans-butene, having a molecular weight of 760 and a iodine-bromine number of 106 g $I_2$/100 g.

The coating system described in this invention can contain also some non-migrating plasticizers. Typical examples for these agents are the linear polymers having the molecular weight of 800 to 1300, for example polyisobutylene, polybutene. The most preferred compound for this purpose is polybuthene, which has the following characteristics: molecular weight: 1290, density: 0.898, acid number: less than 0.01 mg KOH/g, total sulfate concentration: less than 5 ppm.

The term "polymers improving the adhesiveness" comprises also natural resins. Thus, for example the coating system can have also a pine-resin contamination in a quantity of at most 15% by weight. Provided that the coating system contains less than 15% by weight synthetic caoutchouc, the quantity of the softener is preferably 8 to 15% by weight, and of the pine-resin 5 to 10% by weight.

The coating system can contain also other ingredients, thus bactericides and fungicides—e.g., pentachlorphenol, pentachlorphenyl laurate—loading materials—e.g., PVC powder, talc, fine-grained chalk—in a quantity which does not have an unfavourable effect on the properties of the coating system. The preferred concentration is at most 20%.

For the preparation of the layers of the coating system there can be used also aromatic and aliphatic hydrocarbons, as solvents. The most preferred solvents are benzene, toluene, light petrol or mixtures of such solvents.

The pyrolytic resin can be prepared from the by-products boiling over 180° C., obtained cracking the fractions containing mostly aromatic hydrocarbons, by distillation or oxidation. The average molecular weight of these resins is 430 to 450. Elemental analysis: C: 91 to 93% by weight; H: 8 to 62% by weight; S and O: 0% by weight. Softening point: 80 to 90° C.; density: $d_4^{20}$: 1.1779; viscosity at 94° C.: 1.7 to $0.5 \times 10^6$ cP; penetration at 25° C.; (measured according to the Hungarian standard MSz 13162-60): 1 to 10; asphaltene concentration: (measured according to the Hungarian standard MSz 19984-69): 30 to 35% by weight.

The laminated coating system according to this invention can comprise any kind of bitumen or bitumen-pyrolytic resin mixture. The softening point of the bitumen and/or bitumen-pyrolytic resin mixture is: 70° to 120° C. and the penetration thereof is 10 to 40. For example the bitumens marked as 85/25 and 95/25 can be employed, wherein the numerator corresponds to the softening point, and the denominator stands for the penetration. The term "bitumen" here and in the whole specification represents a chemical product obtained from mineral oil or asphalt.

The main physical characteristics of the most preferred laminated coating system disclosed in this application are listed in the following Table 1.

Table 1

| The main physical characteristics of the PVC-foil containing bitumen | |
|---|---|
| Longitudinal breaking expansion (%) | 250 |
| Tensile strength (kp/cm$^2$) | 234 |
| Maximal breaking strength (kp/cm) | 69 |
| Dielectric strength (kV) | 24 |
| Specific resistance (Ohm.cm) | $1.1 \times 10^{14}$ |
| Cold water-uptake (% by weight) (24 hours, 23° C.) | 0.12 |
| Steam permeability (g/m$^2$ × 24 hours) (23° C. 100 % relative humidity) | 2.3 |

When preparing the laminated coating system, the foil is coated by two layers of different composition. The ground layer applied directly onto the top of the foil, has a high adhesive capacity, therefore, in order to prevent the sheets of the foil from sticking together and to ensure the self-adhesiveness also a second layer is employed comprising the petrol solution of synthetic caoutchouc, synthetic caoutchouc-bitumen or synthetic caoutchouc-bitumen-talc. As synthetic caoutchouc preferably polyisobutylene is used. The ground layer can be omitted from the combination, if desired.

The coating of the foil by the ground layer is carried out at a low temperature—30° C. to 50° C.—using a solution of the ingredients or at a higher temperature —110° to 140° C.,—without any solvent. The second layer is applied in form of a solution.

When the ground layer is applied onto the foil in solution form, the solution is of the following composition: 1.5 to 15 part by weight synthetic caoutchouc, 5 to 15 part by weight resin acting as softener and increasing the adhesive capacity, 0.1 to 1 part by weight bactericide, 30 to 62.5 part by weight bitumen and pyrolytic resin and 30 to 40 part by weight solvent. When the coating is accomplished without the use of any solvent the following composition is used: 2 to 10 part by weight synthetic caoutchouc, 20 to 30 part by weight resin acting as softener and improving the adhesive capacity, 0.1 to 1 part by weight bactericide and 59.9 to 77 part by weight bitumen or bitumen and pyrolytic resin.

The solution which the second layer is obtained from comprises 25 to 35 part by weight synthetic caoutchouc, 0 to 15 part by weight talc, 0 to 10 part by weight bitumen and 50 to 65 part by weight solvent.

According to the coating process the ingredients are dissolved in petrol containing aromatic hydrocarbons, thus benzene, toluene, boiling at most 50° to 130° C., and thus preparing a solution containing 20 to 40% solvent. The foil is lead through an adjustable orifice between a role and a "smear knife." The composition is added continuously to the foil, before the "smear knife."

Using the above procedure a uniform layer of 0.05 to 0.3 mm is prepared on the top of the foil. The product is then lead through a drying tunnel at a temperature suitable for eliminating the solvent. The temperature of the product is 30° to 50° C. in the tunnel.

When no solvent is employed, the ground layer is applied onto the foil at 110° to 140° C. in the above-described apparatus. In this case, however, the knife should be heated to a temperature of 100° to 150° C. while the heating of the drying tunnel is not necessary.

The second layer, ensuring self-adhesiveness is applied onto the ground layer in an analogous manner.

The laminated coating system of this invention shows a permanent elasticity, and a high longitudinal breaking expansion, comprises a non-migrating softener, which also improves the adhesive capacity, avoids the use of protecting materials against sticking together of the sheets, and ensures that the overlappings are tight during the application.

The composition of the layers of the laminated coating system included in this invention is illustrated by the following non-limiting Examples. The layers set forth in Example 1 to 3 are formed from a solution, and the layers included in Examples 4 and 5 are applied onto the foil at high temperature, without any solvent.

Example 1

| | Composition | |
|---|---|---|
| | at coating (part by weight) | ready layer (% by weight) |
| Ground layer | | |
| bitumen 87/20 pyrolytic | 39.0 | 65.0 |
| (softening point: 90) | 9.0 | 15.0 |
| polyisobutylene (shore A: 30) | 5.0 | 8.3 |
| terpolymer acting as softener and increasing adhesive capacity (molecular weight: 870) | 6.7 | 11.2 |
| pentachlorophenyl laurate as bactericide | 0.3 | 0.5 |
| toluene | 40.0 | |
| Layer ensuring self-adhesiveness | | |
| Polyisobutylene (Shore A: 30) | 35.0 | 70.0 |
| talc | 15.0 | 30.0 |
| toluene | 50.0 | |

80 g of the ground layer is applied onto 1 m$^2$ of the foil and the temperature of the materials in the drying tunnel is 40° C.

The quantity of the material ensuring self-adhesiveness is 50 g per m$^2$, and the temperature of the materials in the drying tunnel is 40° C.

Example 2

| | Composition | |
|---|---|---|
| | at coating (part by weight) | ready layer (% by weight) |
| Ground layer | | |
| bitumen 95/30 | 45.0 | 64.3 |
| polyisobutylene (Shore A: 30) | 10.7 | 15.3 |
| terpolymer acting as softener and increasing adhesive capacity (molecular weight: 1170) | 14.0 | 20.0 |
| bactericide pentachlorophenyl laurate | 0.3 | 0.4 |
| benzene | 30.0 | |
| Layer ensuring self-adhesiveness | | |
| polyisobutylene (Shore A:20) | 35.0 | 100.0 |

Example 2-continued

| | Composition | |
|---|---|---|
| | at coating (part by weight) | ready layer (% by weight) |
| benzene | 65.0 | |

90 g of the ground layer is applied onto 1 m² of the foil, and the temperature of the materials in the drying tunnel is 45° C. The quantity of the material ensuring self-adhesiveness is 50 g pro m², and the temperature of the material is 40° C. during drying.

Example 3

| | Composition | |
|---|---|---|
| | at coating (part by weight) | ready layer (% by weight) |
| Ground layer | | |
| bitumen 84/27 | 45.0 | 75.0 |
| pyrolytic resin (softening point: 80) | 5.0 | 8.3 |
| terpolymer acting as softener and increasing adhesive capacity (molecular weight: 870) | 8.0 | 13.4 |
| bactericide pentachlorophenol | 0.3 | 0.5 |
| benzene | 40.0 | |
| Layer ensuring self-adhesiveness | | |
| polyisobutylene (Shore A:30) | 25.0 | 62.5 |
| bitumen, 84/27 | 8.0 | 20.0 |
| talc | 7.0 | 17.5 |
| solvent | 60.0 | |

100 g of the ground layer is applied onto 1 m² of the foil, and the temperature of the materials in the drying tunnel is 50° C.

The quantity of the material ensuring self-adhesiveness is 40 g pro m², and the temperature of the material is 40° C. during drying.

Example 4

| | Composition | |
|---|---|---|
| | at coating (part by weight) | ready layer (% by weight) |
| Ground layer | | |
| bitumen 87/20 | 70.0 | 70.0 |
| polyisobutylene (Shore A: 30) adhesive capacity (molecular weight: 870) | 2.5 | 2.5 |
| | 27.0 | 27.0 |
| bactericide, pentachlorophenol | 0.5 | 0.5 |
| Layer ensuring self-adhesiveness | | |
| bitumen 25/30 | 5.0 | 14.3 |
| polyisobutylene (Shore A: 30) | 30.0 | 85.7 |
| toluene | 65.0 | |

100 g of the ground layer is applied pro m² of the foil. The temperature of the product is 130° C. and the temperature of the knife is 130° C.

40 g of the material ensuring self-adhesiveness is applied onto 1 m² and the temperature during drying is 40° C.

Example 5

| | Composition | |
|---|---|---|
| | at coating (part by weight) | ready layer (% by weight |
| Ground layer | | |
| bitumen, 87/20 | 52.0 | 52.0 |

Example 5-continued

| | Composition | |
|---|---|---|
| | at coating (part by weight) | ready layer (% by weight |
| pyrolytic resin (softening point: 83) | 15.0 | 15.0 |
| polyisobutylene (Shore A: 30) | 2.5 | 2.5 |
| terpolymer acting as softener and increasing adhesive capacity (molecular weight: 1170) | 30.0 | 30.0 |
| bactericide, pentachlorophenyl laurate | 0.5 | 0.5 |
| Layer ensuring self-adhesiveness | | |
| bitumen, 95/30 | 8.0 | 16.0 |
| polyisobutylene (Shore A: 30) | 35.0 | 70.0 |
| talc | 7.0 | 14.0 |
| benzene | 50.0 | |

200 g of the ground layer is applied onto 1 m² of the foil, and the temperature of the product is 120° C., the temperature of the knife is 130° C.

EXAMPLE 6

Any of the compositions included on Examples 1 to 5 is applied onto a PVC-foil, and thus a layer of about 1 mm thickness is prepared. A cleaned iron pipe (length: 1 m, diameter: 2") is wound with the laminated coating system. The separated insulating sheets are overlapped to about 10 mm. A 3 mm wide indicator paper is put between the overlapped sheets and the insulated pipe is kept in a diluted acid solution for 7 days. According to the evaluation after 7 days the paper does not change its color, proving that the tightness of the overlappings is sufficient.

EXAMPLE 7

Any of the compositions included in Examples 1 to 5 is applied onto a PVC-foil, and thus a layer of about 0.1 mm is prepared. The laminated coating system obtained is applied by rolling onto beton cubes of the edge length of 0.5 m. The concrete cubes were previously treated with bitumen emulsion to eliminate the dust. The separate insulating sheets are overlapped to about 100 mm. Thus a waterproof insulation having a good adhesion on concrete is obtained.

Some of the characteristics of the laminated coating system according to this invention are set forth in the following Table 2.

Table 2

| | |
|---|---|
| Longitudinal breaking expansion (%) | 250 |
| Tensile strength (kp/cm²) | 225 |
| Maximal breakin (kp/cm) | 69 |
| Dielectric strength (kV) | 26 |
| Specific resistance (Ohm . cm) | $5.26 \times 10^{15}$ |
| Cold water - uptake (% by weight) (24 hours, 23° C.) | 0.08 |
| Steam permeability (g/m² × 24 hours) (23° C., 100% relative humidity) | 1.8 |

What we claim is:
1. A laminated coating system, useful for insulation of underground pipe lines, metal and concrete objects, which comprises:
   a PVC-foil carrier sheet having a thickness of 0.2 to 0.5 mm;
   a self-adhesion ensuring layer on said carrier sheet and comprising 70 to 100% by weight of synthetic rubber; 0 to 16% by weight of bitumen and 0 to 14% by weight of talc, said self-adhesion ensuring layer having a thickness of 0.05 to 0.2 mm, further including a ground layer on said carrier sheet and interposed between the carrier sheet and the self-adhesion ensuring layer, said ground layer comprising 5 to 20% by weight of synthetic rubber, 10 to 25% by weight of a softening and adhesiveness improving polymer having a molecular weight of 500 to 1200 and an iodine-bromine number of 80 to 120 g$I_2$/100 g, 0.1% to 1% by weight of a bactericide and 54 to 84.9% by weight of bitumen or a 4:1 mixture of bitumen and a pyrolytic resin, said ground having a total thickness of 0.05 to 0.1 mm.

2. The system according to claim 1, wherein the carrier sheet contains 6 to 14% by weight of bitumen.

3. The system, according to claim 1, wherein the synthetic rubber is polyisobutylene or chloroprene.

4. The system, according to claim 1, wherein the synthetic rubber is an isobutylene copolymer having a density of 0.92 g/cm$^3$; a shore hardness (Shore A) of 30; a cold resistance of $-50°$ C.; a specific resistance of $10^{15}$ Ohm cm; and a dielectric strength of 23 kV/mm.

5. The system, according to claim 1, wherein the bactericide is pentachlorphenol or pentachlorphenyl laurate.

6. The system, according to claim 1, wherein the softening and adhesiveness improving polymer is an isobutylene-butadiene-cis/transbutene terpolymer.

7. The system, according to claim 6, wherein said terpolymer is constituted from 45% isobutylene, 33% butadiene, 12% cisbutene, 10% transbutene, and has a molecular weight of 760 and an iodine-bromine number of 106 g $I_2$/100 g.

8. The system, according to claim 1, wherein the bitumen is 85/25–95/25 and has a softening point of 70 to 120° C.

9. The system, according to claim 1, wherein the bitumen has a softening point of 25 to 95 and a penetration of 20 to 30.

10. The system, according to claim 1, wherein the ground layer contains a 4:1 mixture of bitument and pyrolytic resin.

11. The system, according to claim 10, wherein the pyrolytic resin has a softening point of 90° C. and a penetration of 1 to 10/25° C.

12. The system, according to claim 1, wherein the softening point of the bitumen and/or bitumen pyrolytic resin mixture is 70 to 120° C. and has a penetration of 10 to 40, 13. The system, according to claim 1, wherein said pyrolytic resin has an average molecular weight of 430 to 450; a softening point of 80° to 90° C.; a density of $d_4^{20}$ of 1.1779; a viscosity at 94° C. of 1.7 to $0.5 \times 10^6$ cP; a penetration at 25° C. (measured according to Hungarian Standard MSz 13162-60) of 1 to 10; an asphaltene concentration (measured according to Hungarian Standard MSz 19984-69) of 30 to 35% by weight; and an Elemental analysis of C: 91 to 93% by weight, H: 8 to 62% by weight; S and O: 0% by weight.

14. The system, according to claim 1, further containing a non-migrating plasticizer.

* * * * *